United States Patent Office 3,546,254
Patented Dec. 8, 1970

3,546,254
CATALYTIC DEHYDROCYCLIZATION OF ORTHO-SUBSTITUTED PHENOLS
Gerassimos Frangatos, Haddon Township, Camden County, N.J., assignor to Mobil Oil Corporation, a corporation of New York
No Drawing. Continuation-in-part of application Ser. No. 391,009, Aug. 20, 1964. This application Mar. 6, 1969, Ser. No. 804,973
The portion of the term of the patent subsequent to Jan. 7, 1986, has been disclaimed
Int. Cl. C07d 5/42
U.S. Cl. 260—346.2
12 Claims

ABSTRACT OF THE DISCLOSURE

The presence of the gaseous substance containing sulfur (e.g., $H_2S$) and of a sulfur-resistant dehydrocyclization catalyst (e.g., sulfided nickel-tungsten) improves the selectivity and yields in the production of aromatic furan compounds (e.g., benzofuran) by the dehydrogenation and cyclization of a phenol substituted in the ortho position with an organic radical containing at least two carbon atoms in the alpha and beta positions (e.g., o-ethylphenol) by heating the phenolic compound at dehydrocyclization temperatures (e.g., 575–625° C.).

CROSS-REFERENCE TO RELATED APPLICATION

This application is a continuation-in-part of my application Ser. No. 391,009 filed Aug. 20, 1964 now abandoned.

BACKGROUND OF THE INVENTION

Field of the invention

The present invention relates to an improved catalytic method for the production of aromatic furans by the dehydrogenation and cyclization (also referred to herein as dehydrocyclization) of certain ortho-substituted phenols. In one embodiment it is concerned with the catalytic dehydrocyclization of o-ethylphenol to form 2,3-benzofuran.

Prior art

Coumarone or 2,3-benzofuran is a colorless liquid which is useful as a relatively high boiling solvent for various resins and also for organometallic compounds. In addition, it is copolymerized with indene in forming thermoplastic indene-coumarone resins used in coatings and printing inks.

Commercial benzofuran is a mixture of 2,3-benzofuran and various substituted benzofurans obtained from coal tar oils. Prior art methods for the synthesis of benzofuran and its substituted derivatives are expensive by reason of complicated procedures or low yields. For example, the preparation of benzofuran by treating phenoxyacetaldehyde with zinc chloride has been reported, and also the reaction of alpha-chloroacetoacetate and sodium phenolate in forming methyl benzofuran. In addition, benzofuran has been produced by vapor phase catalytic dehydrocyclization in low yields amounting to a maximum of 5.8% from phenetole (ethoxybenzene) in the presence of iron oxides (Chemical Abstracts, 57, 5867, 1962), and 4.1 to 11.3% from o-ethylphenol using such catalysts as palladium on activated charcoal (JACS, 71, 943–944, 1949) and combinations of chromium-copper compounds or chromium-zirconium compounds on a similar support (Ind. & Eng. Chem., 42, 2114–2117, 1950).

SUMMARY OF THE INVENTION

It has now been discovered that unsubstituted and substituted benzofurans (benzenoid furans) can be produced in high yields by a simple and highly selective process wherein certain substituted phenols are subjected to simultaneous dehydrogenation and cyclization at elevated temperatures in the presence of a gaseous substance containing sulfur and of certain dehydrocyclization catalysts which are not rapidly deactivated by sulfur. Such results are surprising because there was reason to believe that hydroxythiophenes were more likely to be produced.

Accordingly, the present invention concerns a process of forming an aromatic furan by ring closure which comprises dehydrogenating and cyclizing an ortho-substituted phenol by heating said phenol at a dehydrocyclization temperature in the presence of a gaseous substance containing sulfur and of a sulfur-resistant dehydrocyclization catalyst to form an aromatic furan according to the equation:

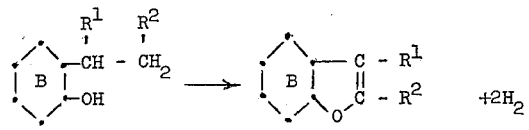

wherein the dotted hexagonal ring B contains benzenoid unsaturation and represents a radical of the group consisting of substituted and unsubstituted monocarbocyclic and polycarbocyclic aromatic radicals; any substituents on said aromatic radical are members of the group consisting of fluorine and chlorine atoms and nitro, alkoxy, cyano, dialkylamino, alkylene, aryl, aralkyl, alkaryl, cycloalkyl and alkyl radicals, and $R^1$ and $R^2$ each independently designates a member of the group consisting of a hydrogen atom and said substituents. Other aspects of the invention relate to preferred catalysts, reactants and reaction temperatures.

DESCRIPTION OF SPECIFIC EMBODIMENTS

The aromatic reactant in the instant process may be either unsubstituted or substituted in one or more positions on either the nucleus (i.e., in the 3, 4, 5 or 6 position) or any side chains including the alpha and beta carbon atoms in the aliphatic radical in the ortho position. Thus the phenolic compound may be substituted in many different ways with a wide variety of substituents, as disclosed herein subject to the usual reservation against substituents which would substantially interfere with the present dehydrogenation and cyclization reactions as, for instance, by poisoning the catalyst or promoting side reactions in preference to the desired dehydrocyclization. Unless otherwise indicated herein, "ortho-substituted phenol" and like expressions are employed in the generic sense of designating aryl hydroxides, having a substituent or alkyl group, respectively, in ortho orientation relative to the hydroxyl radical and which may also have additional substituents on the carbon atoms of the benzene ring or of the aliphatic side chain. These terms include polycyclic phenols, such as 2-ethyl naphthol and 2-propyl phenanthrol, as well as the preferred monocyclic alkylphenols. Suitable reactants have two or more carbon atoms in the aliphatic side chain in the ortho position, one or more hydrogen atoms attached to the alpha carbon atom thereof, and two or more hydrogen atoms attached to the beta carbon atom.

Among the many suitable substituents for either ring or side chain hydrogen atoms are fluorine and chlorine atoms, nitro, alkoxy, cyano, dialkylamino, alkylene, aryl, aralkyl, alkaryl, cycloalkyl and alkyl radicals. For illustration, each of the named organic radicals may contain from 1 to 10 carbon atoms. Inasmuch as the dehydrocyclization reaction is usually carried out in the vapor phase, the phenolic starting material should preferably be a vaporizable material. That is, the reactant should have sufficient thermal stability for vaporization without decomposition at atmospheric pressure and its boiling point should be below the selected dehydrocyclization temperature, for example, below about 650° C. in most instances. The aforesaid ortho-substituted phenols typically have such vaporization characteristics. Suitable phenolic starting materials include o-butylphenol, o-isopropylphenol, o-(3-methylbutyl)phenol, o - (3,3-dimethylbutyl)phenol, o-hexylphenol, 2-hexyl-4,5-dichlorophenol, 2-ethyl-6-cyanophenol, o - (2-cyclohexylethyl)phenol, o - (2-phenylethyl)phenol, 2-ethyl-3-chlorophenol, 2-ethyl-3-fluorophenol, 2-ethyl-3-nitrophenol, o-(2-phenylethyl)-alpha-naphthol and o-(2-cyclohexylethyl)-alpha-naphthol as well as others mentioned hereinafter to name only a few for the purposes of illustration.

By means of the present process, the aforesaid phenol reactants are converted by the dehydrogenation and cyclization of the ortho oriented hydroxyl and aliphatic radicals into the corresponding benzenoid furans, that is benzofuran compounds containing a carbocyclic ring having unsaturation of the benzene type and linked directly to a heterocyclic furan ring, plus substituents corresponding to any substituents on the aliphatic phenol. "Aromatic furan" or "benzenoid furan" are employed herein, unless otherwise indicated, in the same broad sense as "ortho-substituted phenol," etc., to encompass substituted and unsubstituted benzofurans including those of the polycyclic aromatic type.

Some of the many products which may be synthesized from starting materials of the type described herein are, inter alia, 2-methylbenzofuran, 2-cyclohexylbenzofuran, 2-butylbenzofuran, 2-phenylbenzofuran, 5-chlorobenzofuran, 5-nitrobenzofuran, 5,7-dichlorobenzofuran and 5-methylbenzofuran as well as others named herein and the derivatives of the aforementioned phenolic reactants.

A catalyst is essential in the practice of this invention, and any sulfur-resistant catalytic substance or composite material capable of simultaneously (i.e. in a single reaction stage) catalyzing the dehydrogenation and cyclization of ortho-substituted phenols is suitable. In general, dehdrogenation catalysts which maintain substantialy catalytic activity in the presence of sulfur (e.g., are neither poisoned nor rapidly deactivated by hydrogen sulfide) and are sufficiently refractory to withstand the elevated reaction temperature may be utilized. For example, the sulfides of nickel, tungsten, iron, cobalt, manganese, vanadium, molybdenum, niobium (columbium) and phosphorus as well as various mixtures thereof may be used as the active catalytic material and a combination of nickel and tungsten sulfides is particularly recommended for the purpose. Such compounds have a tendency to oxidize upon standing and it is often desirable to activate them before charging the substituted phenol. This may be readily accomplished by passing a dry mixture of hydrogen and hydrogen sulfide over the heated catalyst until the effluent gases are free of moisture. If desired, the catalyst may be charged to the reaction in elemental form or as an oxide and converted into the sulfide either in situ during the dehydrocyclization reaction or more desirably by pretreatment with hydrogen sulfide and hydrogen. Many other catalysts are suitable including, inter alia, chromia, magnesia, acidic alumina and acid-treated clays. The active catalyst may be dispersed or supported on an inert carrier material in particle form, as exemplified by chromia-alumina composites.

A gaseous substance containing sulfur is introduced into the reaction chamber along with the phenolic reactant to eliminate the formation of unwanted tarry products produced in at least some instances and to accelerate the dehydrogenation reaction. In general, the reaction rate appears to be proportional to the concentration of sulfur-containing gas or vapor in the reaction chamber. Also, in the case of sulfide catalysts, it appears that this addition tends to make up any sulfur losses from the catalyst and maintain a constant combined sulfur content in the catalyst throughout the reaction. Hydrogen sulfide is excellent for the purpose and readily available at relatively low cost. However, other sulfur-containing gases or vapors as exemplified by carbonyl sulfide, sulfur vapor, sulfur dioxide gas and carbon disulfide vapor may be charged. All of the materials named are believed to react at the elevated temperature with hydrogen liberated by the reaction to form hydrogen sulfide. The molar ratio of sulfur added in this manner to phenolic reactant can vary considerably and it is desirable to determine the optimum ratio for the particular reaction conditions selected. In general, a molar ratio of about 1:1 to 20:1 is recommended. However, it is also contemplated that at least part of the benefits of this invention may be obtained in some cases for limited periods of time with ratios as low as about 0:1:1 and that ratios as high as 100:1 or more would be suitable from a technical standpoint but probably uneconomical in most instances.

For simultaneous dehydrogenation and cyclization the temperature in the closed reaction vessel should be high enough to induce a good reaction rate so that an adequate yield of the product may be obtained at reasonable space velocities. On the other hand, the temperature should not be raised so high that the yield drops off or the decomposition of the product or the starting material occurs. For the ortho-substituted phenols in general, the reaction temperature is desirably above about 400° C.; and in the case of the preferred o-ethylphenol reacting in contact with the preferred sulfided nickel-tungsten catalyst, the reaction temperature is preferably above about 500° with optimum results being obtained within the range of about 575–625° C. The reaction is exothermic and the temperature of the catalytic chamber is controlled in conventional manner. In addition, it is recommended that all materials charged be preheated at least sufficiently to completely vaporize them prior to contact with the catalyst.

The reaction pressure is not critical, so subatmospheric or superatmospheric pressures may be used according to desire. However, it is seldom, if ever, desirable to raise the dehydrocyclization reaction pressure to the extent where the preferred vapor phase reaction is converted into either a mixed or liquid phase reaction. In general, atmospheric pressure is preferred for convenience, simplicity and economy in carrying out the reaction.

The space velocity may vary considerably depending on the reactivity of the starting material, the activity of the dehydrocyclization catalyst and the reaction temperature. In addition, the reaction mixture may be recycled repeatedly over a single catalyst mass or sequentially passed passed over several catalysts of the same or different composition. However, high yields per pass are obtainable in the case of o-ethylphenol and it is usually preferred to recycle only the unreacted material in the product stream after the product has been separated therefrom.

For a better understanding of the nature and objects of of this invention, reference should be had to the following detailed examples. All proportions are given in terms of weight and all temperatures expressed as degrees centigrade throughout the present application unless otherwise stated.

EXAMPLE 1

Pellets of a commercial sulfided nickel-tungsten catalyst ($NiS-WS_2$) are crushed to a particle size range of 14 to 25 mesh and introduced into a heat-resistant glass tube reactor (16 inches long—0.75 inch internal diameter) to form a fixed bed with a volume of 28.8 ml. supported on a plug of glass wool. The catalytic material is found by elementary analysis to contain 17.3% by the weight of nickel, 41.4% tungsten and 27.03% sulfur. A layer of glass beads is placed on top of the crushed pellets to form a preheating zone for the charge.

Prior to starting the dehydrocyclization reaction, the catalyst mass is activated by passing a mixture of equal volumes of hydrogen and hydrogen sulfide through the bed overnight at a total rate of 22.4 liters per hour (measured at normal temperature and pressure) while maintaining the catalyst at about 300° C. by the use of electric heating means surrounding the reactor.

After activation, the catalyst bed is heated up to 598° C. and held there throughout the reaction while liquid o-ethylphenol is charged by a motor driven syringe to the top of the reactor at a rate equivalent to a liquid hourly space velocity (LHSV) of one, namely 28.8 ml. of liquid per hour, along with hydrogen sulfide which is introduced at a rate of 22.4 liters per hour. The ethylphenol is quickly vaporized and then preheated together with the $H_2S$ in passing downward through the hot beads toward the catalyst bed of the down flow reactor. Atmospheric pressure is employed for the reaction.

A product stream is taken off the bottom of the reactor and quickly cooled to a temperature of about 0° C. in a receiving flask in an ice-water bath to condense the normally liquid constituents. By vapor phase chromatographic analysis, the composition by weight of the liquid condensate is found to be as follows:

| | Percent |
|---|---|
| 2,3-benzofuran | 61.33 |
| o-Ethylphenol | 37.67 |
| Phenol | 1.00 |

An insignificant amount of ethylcyclohexanone is also detected by carbonyl absorption at 5.83 mu. in an infrared determination. Benzofuran of high purity is separated from the reaction products by a fractional distillation in which the product distills at about 170° C. under atmospheric pressure. When a substantially quantitative yield is desired, the unreacted o-ethylphenol may be recycled to the reactor.

EXAMPLE 2

Example 1 is repeated in all particulars except for maintaining the catalyst and reaction mixture at 552° C. and the composition of the reaction product is:

| | Percent |
|---|---|
| Benzofuran | 34.20 |
| o-Ethylphenol | 65.12 |
| Phenol | 0.68 |

EXAMPLE 3

The procedure of Example 1 is again repeated except for maintaining the catalyst and reaction mixture at 498° C. and the composition of the reaction product is:

| | Percent |
|---|---|
| Benzofuran | 13.2 |
| o-Ethylphenol | 85.3 |
| Phenol | 1.5 |

EXAMPLE 4

In the further attempt at repeating Example 1 at a still lower reaction temperature of 404° C., it is found that no appreciable amount of benzofuran is formed.

EXAMPLE 5

In a manner similar to that of Example 1, a mixture of 7 mols of hydrogen sulfide per mol of o-ethylphenol with an equal weight of benzene as an inert diluent is passed at 2.0 LHSV (calculated on a basis of phenolic reactant) through a bed maintained at 600° C. of 8 to 14 mesh particles of a commercial chromia-alumina catalyst (Harshaw Cr0205) having a surface area of 60 square meters per gram. The chromium content of this catalyst is 19% and the alumina is activated alumina of low acidity.

The composition of the product is:

| | Percent |
|---|---|
| Benzofuran | 35.6 |
| o-Ethylphenol | 60.0 |
| Phenol | 1.6 |
| o-Cresol | 1.6 |
| Aromatic hydrocarbons | 1.2 |

The selectivity of this reaction is 89% and it may be postulated that conversion would be improved at a lower space velocity.

EXAMPLE 6

The procedure of Example 5 is followed with a charge containing hydrogen sulfide and 4-chloro-2-ethylphenol in a 2:1 molar ratio along with the benzene passing through a bed of the same catalyst at 0.5 LHSV and 600° C. in producing a liquid product of the following composition:

| | Percent |
|---|---|
| 5-chlorobenzofuran | 56.9 |
| Benzofuran | 23.8 |
| 4-chloro-2-ethylphenol | 5.0 |
| 2-ethylphenol | 4.8 |
| Unidentified | 9.5 |

The 5-chlorobenzofuran is separated from the reaction products by fractional distillation.

EXAMPLE 7

Example 6 is repeated using 6-chloro-2-ethylphenol instead of the 4-chloro-2-ethylphenol to obtain substantially identical product distribution except that the unreacted component increases to 7.0% and the 7-chlorobenzofuran content of the resulting product is 55.8%.

Examples 8 to 14 tabulated hereinafter are carried out according to the procedure of Example 1 in cyclizing a variety of substituted o-alkyphenols in admixture with an equal weight of benzene in the presence of carbonyl sulfide in one pass through a bed of a magnesium oxide catalyst (Harshaw 0601) having a particle size of 8 to 14 mesh and a surface area of 21 square meters per gram. Reaction conditions, including gas ratio and LHSV, are essentially the same in all runs except for the temperature and starting material as noted in the table.

| Example | Phenolic reactant | Reaction temp., °C. | Conversion, wt. percent | Selectivity | Wt. percent |
|---|---|---|---|---|---|
| 8 | 4-methyl-2-ethylphenol | 600 | 60 | 5-methylbenzofuran | 90 |
| 9 | 2,4-diethylphenol | 600 | 70 | 5-ethylbenzofuran | 62 |
| 10 | 4,6-dichloro-2-ethylphenol | 550 | 54 | 5,7-dichlorobenzofuran | 42 |
| 11 | 4,5-dimethyl-2-ethylphenol | 600 | 50 | 5,6-dimethylbenzofuran | 90 |
| 12 | 4-fluoro-2-ethylphenol* | 600 | 90* | 5-fluorobenzofuran | 90 |
| 13 | 6-fluoro-2-ethylphenol | 630 | 70 | 7-fluorobenzofuran | 94 |
| 14 | 5-methyl-2-isopropylphenol (thymol) | 630 | 100 | 3,6-dimethylbenzofuran | 21 |
| | | | | 2,6-dimethylbenzofuran | 7 |
| | | | | 6-methylbenzofuran | 54 |
| | | | | m-Cresol | 18 |

*Charge contains 25% 4-fluoro-2-ethylphenol, on which the percent conversion is based, in admixture with 25% of inert 4-fluorophenol and 50 wt. percent of inert benzene.

Example 14 demonstrates that it is possible to cyclize an alkylphenol having substituents on both the benzene ring and side chain to form the correspondingly substituted benzofuran. Upon consideration of the 100% conversion and the relatively high reaction temperature in that example, it is thought that the selectivity can be significantly improved by adopting various expedients within the scope of the present invention such as moderating the reaction conditions or employing a metal sulfide or substituting hydrogen sulfide for the carbonyl sulfide.

Upon considering the foregoing examples in conjunction with the state of the art, it is apparent that the present invention is strikingly superior in providing improved selectivities of better than 95% in some instances and greatly increased yields in a simple and economical process.

While the present invention has been set forth in detail in the preceding examples, these examples are intended to be of an illustrative rather than a limiting nature; and it will be apparent to those skilled in the art that there are many other modifications and embodiments of this invention.

What is claimed is:

1. A process of forming an aromatic furan by ring closure which comprises dehydrogenating and cyclizing an ortho-substituted phenol by heating said phenol at a dehydrocyclization temperature in the presence of a substance in the vapor state of the group consisting of hydrogen sulfide, carbon disulfide, carbonyl sulfide, sulfur dioxide and sulfur and of a refractory sulfur-resistant dehydrocyclization catalyst of the group consisting of chromia, magnesia, acidic alumina, acid-treated clays and sulfides of tungsten, nickel, iron, cobalt, manganese, vanadium, molybdenum, niobium, and phosphorus to form said aromatic furan according to the equation:

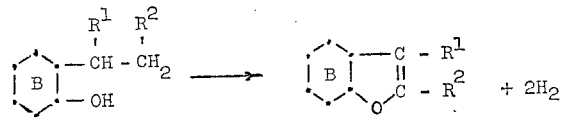

wherein the dotted hexagonal ring B represents a benzene ring in a radical of the group consisting of substituted and unsubstituted monocarbocyclic and polycarbocyclic aromatic radicals; and substitutents on said aromatic radical are members of the group consisting of fluorine and chlorine atoms and nitro, alkoxy, cyano, dialkylamino, alkylene, aryl, aralkyl, alkaryl, cycloalkyl and alkyl radicals, and $R^1$ and $R^2$ each designates a member of the group consisting of a hydrogen atom and said substituents.

2. A process according to claim 1 in which said gaseous substance is hydrogen sulfide.
3. A process according to claim 1 in which said catalyst comprises sulfides of nickel and tungsten.
4. A process according to claim 1 in which said phenol is monocyclic.
5. A process according to claim 1 in which said phenol is o-ethylphenol.
6. A process according to claim 1 in which said phenol is a monocyclic phenol having an ortho substituent consisting of carbon and hydrogen atoms and said substance is of the group consisting of hydrogen sulfide and carbonyl sulfide.
7. A process according to claim 6 in which the dehydrocyclization temperature is above about 400° C.
8. A process involving ring closure which comprises dehydrogenating and cyclizing o-ethylphenol vapor by heating at a dehydrocyclization temperature in the presence of hydrogen sulfide and a dehydrocyclization catalyst of the group consisting of sulfides of tungsten, nickel, iron, cobalt, manganese, vanadium, molybdenum, niobium and phosphorus to form 2,3-benzofuran.
9. A process according to claim 8 in which said catalyst comprises sulfides of nickel and tungsten.
10. A process according to claim 8 in which the dehydrocyclization temperature is above about 500° C.
11. A process according to claim 8 in which the dehydrocyclization temperature is within the range of about 575 to 625° C.
12. A process involving ring closure which comprises dehydrogenating and cyclizing o-ethylphenol by heating a gaseous phase mixture of hydrogen sulfide and said o-ethylphenol to a temperature between about 575 and 625° C. in the presence of a dehydrocyclization catalyst comprising sulfides of nickel and tungsten to form 2,3-benzofuran.

References Cited

UNITED STATES PATENTS 2,891,965   6/1959   Voltz et al. _____ 260—346.2

ALEX MAZEL, Primary Examiner

B. I. DENTZ, Assistant Examiner

U.S. Cl. X.R.

252—439, 450, 463, 467, 475